Patented Dec. 2, 1947

2,432,023

UNITED STATES PATENT OFFICE 2,432,023

PROCESS FOR THE PREPARATION OF ARYLDIALKYLOLAMINES

Hans Z. Lecher, Plainfield, and Martin L. Kesler, Middlesex, N. J., assignors to American Cyanamid Company, New York, N. Y., a corporation of Maine No Drawing. Application March 19, 1943, Serial No. 479,782

8 Claims. (Cl. 260—573)

This invention relates to an improved process for the preparation of aromatic hydroxyalkyl amines, and more particularly to an improvement in the reaction of alkylene oxides with primary aromatic amines of the benzene and naphthalene series.

Aromatic amines have been reacted in the past with alkylene oxides such as ethylene oxide in order to produce the tertiary amines containing two hydroxyalkyl groups. These compounds are important intermediates for the production of azo dyes for use in dyeing cellulose acetate and similar materials.

In the past the reaction has presented numerous difficulties such as control of the exotherm of the reaction and the like. The reaction appears to start slowly and may then become violent. It is our belief, although it is not desired to limit the present invention to any theory of action, that one factor may be the low solubility of the alkylene oxide in the aromatic amine which makes it difficult to build up a concentration sufficiently high to get the reaction started at a satisfactory rate. As a result considerable amounts of reactants build up in the mixture and after the reaction sets in it may become very violent.

The problem of prompt starting of the reaction and good outputs is complicated by the fact that the variation of solubility with temperature is opposite to the variation of the reaction rate. In other words, at low temperatures the alkylene oxide is more soluble in the amine but the reaction rate is very slow. At high temperatures satisfactory reaction rates are obtainable but the solubility then becomes very low. It is possible to obtain some measure of improvement by operating in an autoclave under pressure, which increases the solubility of the alkylene oxide, but this is only a palliative and the reaction still remains a serious one to control.

According to the present invention we have found that the above difficulty may be to a large extent avoided by carrying out the reaction in the presence of a substantial amount of the already formed tertiary base. In practice this may be a crude reaction product of a preceding batch. A marked increase in solubility of the alkylene oxide is effected if substantial amounts of the tertiary base are present. While the exact amounts are not critical, we find that real improvement is not obtained unless a minimum of about 10% is used, based on the aromatic amine. Better results are obtained with larger amounts and for practical operation we find that amounts between 20 and 25% are preferable. It should be understood that larger amounts may be used, but when about 25% is exceeded the improvement in solubility is not sufficient to compensate for the reduced capacity of the reaction vessel and, while the process operates with extreme smoothness and great ease, with higher amounts of the tertiary base these larger amounts are not economically justified. For this reason amounts between 20 and 25% constitute the preferred modification of the present invention for large scale commercial operation.

The increased solubility of the alkylene oxide which is obtained by means of the present invention insures a proper concentration at the start of the reaction which starts readily and is, therefore, easy to regulate.

The present invention is applicable in general to the reaction of alkylene oxides with primary amines of the benzene and naphthalene series, such as aniline, its homologues, halogen derivatives, nitro derivatives, alkoxy and aryloxy derivatives, cyano derivatives, sulfone and sulfonamide derivatives, naphthylamines, their homologues and the corresponding derivatives.

Typical alkylene oxides which may be used in the present invention are ethylene oxide, propylene oxide, and butylene oxides.

The reaction may be carried out by heating the amine mixture to reaction temperature and then introducing the alkylene oxide in either vapor or liquid form in approximately the rate it is consumed. It is not necessary to use a pressure vessel and a simple reflux condenser serves as a gauge to show unreacted alkylene oxide and to determine the proper rate of addition.

The best reaction temperature will depend to some degree on the reaction components chosen. In general we prefer to operate at temperatures above 100° C.

While it is an advantage of the present invention that pressure vessels do not have to be used, it should not be inferred that the use of autoclaves is excluded from the present invention. Where they are available further increased solubility is obtainable by operating under pressure and in cases where idle autoclaves are available the use of pressure vessels may be economical. This added flexibility of the reaction constitutes a further advantage of the present invention.

The present invention improves the solubility of the alkylene oxide in the reaction mixture and this improvement is obtained regardless of the particular reaction components. There has been described and claimed in the copending application of Kesler, Serial No. 479,781, filed March 19, 1943, an improvement in the process of reacting primary aromatic amines with alkylene oxides which consists in the use of strongly acid catalysts, such as strong acids or salts of the strong acids with weak bases. In general the acids hould rave a dissociation constant greater than $10^{-6}$. Weaker acids do not have the desired effect. Typical strong acids which may be used are inorganic acids, such as hydrochloric acid, sulfuric acid and phosphoric acids, and organic acids, such as formic, acetic, maleic, succinic, benzoic, and the like.

These strong acids will in general react with the aromatic amines to form salts and the content of the acid required may, therefore, be introduced into the reaction mixture in the form of its salt with the aromatic amine which is to enter into reaction. This method of introducing the acid catalyst presents considerable practical operating advantages.

Salts of the strong acids, such as those described above with weak bases, may also be used. Typical of such salts are aluminum chloride, zinc chloride, aluminum sulfate, antimony trichloride, zinc bromide, stannous chloride, aluminum benzoate, zinc formate, zinc benzoate, and the like.

While the catalyst does not depend on a particular acid anion, it is, of course, necessary that neither the anion nor the cation of the catalyst be such as to adversely affect the reaction. Thus, for example, catalysts which would oxidize or substitute in the primary amine are unsuitable. For example, ferric salts are in general unsuitable because of their oxidizing action. Nitrites react with the amino group to give diazo compounds, and should, therefore, be avoided. Certain chlorine compounds, such as antimony pentachloride, are not suitable because they are chlorinating agents which tend to chlorinate the amine. It should be noted that these adverse reactions with the amine are such as change the nucleus or the basic portion itself. Salt formation, either ordinary or complex, does not have any adverse effect and in fact may contribute to the catalytic reaction and, as has been pointed out above, in the case of free acids the catalyst is present in the reaction as a salt of the acid and the aromatic amine.

In addition to the necessity of avoiding catalysts which will react with the nucleus or basic portion of the amine, it is also necessary to avoid catalysts which will react with the alkylene oxide. Thus, for example, certain hydroxy or amino acids tend to react with the alkylene oxide itself and are, therefore, undesirable.

The catalysts are useful in sufficient amounts to be effective, but in general less than 5% of the weight of the aromatic amine should be used.

The feature of using a strong acid catalyst is not claimed per se in the present application, but it is included as a preferred modification when associated with the primary feature of the present invention, namely the addition of a substantial amount of the tertiary amine to increase solubility of the alkylene oxide in the reaction mixture.

The invention will be described in the following examples in which the parts are by weight.

*Example 1*

186 parts of aniline are charged into a jacketed vessel equipped with a stirrer and reflux condenser, the latter one being provided with a sight glass and cooled with brine at $-5°-0°$ C. 46.5 parts of molten phenyldiethanolamine are added. The charge is heated by means of jacket steam to 135-137° C. Then the steam is shut off and 179.6 parts of ethylene oxide are passed under the surface of the aniline-phenyl-diethanolamine mixture during about 2½ hours. This corresponds to a 2% excess over 2 moles of ethylene oxide for each mole of aniline. The reaction starts almost at once as indicated by a rise in temperature. No more external heat is required for the reaction. The temperature is maintained at 130-140° C. by the rate of addition of ethylene oxide and by occasional cooling by means of water in the jacket of the reaction vessel. If an excess of ethylene oxide should be present at any time, it is returned to the charge by means of the reflux condenser. This acts as a gauge to govern the rate at which the ethylene oxide can be added and indicates when the reaction is over. Thus, there is no refluxing during the addition of the ethylene oxide except at the end of the reaction when a slight excess of ethylene oxide is present.

When the reaction is over, the charge is cooled to 80-90° C. and is removed from the reaction vessel and allowed to crystallize. The yield on phenyl-diethanolamine is above 98% of theory and the setting point is 54.25° C., indicating a high purity.

If in the above example the addition of phenyl-diethanolamine is omitted, the ethylene oxide introduced at 135° C. is very slow to react as indicated by the reflux condenser. The condensed and cooled oxide running back into the charge makes it difficult to maintain the temperature at the desired level. Only after a considerable and hazardous delay when about 20% of the oxide has reacted, in other words, when a considerable amount of phenyl-diethanolamine is produced and increases the solvent action, the reaction proceeds smoothly and no ethylene oxide shows up in the condenser.

*Example 2*

Aniline is reacted with ethylene oxide in the presence of 25% of phenyl-diethanolamine as described in Example 1, except that the reaction is carried out at a temperature of 100-110° C. The reaction starts at once and there is only an occasional reflux during the course of the reaction. The yield is above 98% of theory and the setting point is 54.0° C.

*Example 3*

The experiment of Example 1 is carried out using instead of 186 parts of aniline, 214 parts of m-toluidine, and instead of 46.5 parts of molten phenyl-diethanolamine, 55 parts m-tolyl-diethanolamine; an excellent yield of very pure m-tolyl-diethanolamine is obtained.

Other aromatic amines such as beta naphthylamine and p-anisidine may be reacted with ethylene oxide in the same manner. Instead of ethylene oxide equivalent amounts of propylene oxide may be used with equal success.

*Example 4*

186 parts of aniline are charged into a jacketed vessel equipped with a stirrer and reflux condenser, the latter one being provided with a sight glass and cooled with brine at $-5°-0°$ C. There are added 46.5 parts of molten phenyl-diethanolamine and 7 parts of aniline hydrochloride. The charge is heated and kept at about 50° C. by means of steam or water in the jacket. 179.6 parts of ethylene oxide are passed under the surface of the liquid at such a rate as it is consumed. There is obtained very pure phenyl-diethanolamine in excellent yield.

In the claims, the term "benzene and naphthalene series" is used in its ordinary sense to refer to mononuclear compounds containing a single benzene ring and binuclear compounds containing a single naphthalene ring. It is used in no other sense or meaning.

We claim:

1. In a process for producing an N,N bis-(beta-hydroxy alkyl)-arylamine of the benzene and naphthalene series, by the reaction of an alkylene oxide on the corresponding primary amine, the improvement which comprises mixing with the primary amine prior to the addition of alkylene oxide an amount of the N,N bis-(beta-hydroxy alkyl)-arylamine to be produced corresponding to at least 10% of the weight of the primary amine.

2. In a process for producing an N,N bis-(beta-hydroxy alkyl)-arylamine of the benzene and naphthalene series, by the reaction of an alkylene oxide on the corresponding primary amine, the improvement which comprises mixing with the primary amine prior to the addition of alkylene oxide an amount of the N,N bis-(beta-hydroxy alkyl)-arylamine to be produced corresponding to at least 20–25% of the weight of the primary amine.

3. In a process for producing an N,N bis-(beta-hydroxy alkyl)-arylamine of the benzene and naphthalene series, by the reaction of an alkylene oxide on the corresponding primary amine, the improvement which comprises mixing with the primary amine before the introduction of the alkylene oxide an amount of the N, N bis-(beta-hydroxy alkyl)-arylamine to be produced corresponding to at least 10% of the weight of the primary amine and an effective amount of a catalyst belonging to the group consisting of acids having a dissociation constant greater than $10^{-6}$ and salts thereof with weak bases, the catalyst being free from hydroxy amino groups incapable of substituting or oxidizing the primary amine under reaction conditions and being dispersible in the reaction mixture.

4. In a process for producing an N,N bis-(beta-hydroxy alkyl)-arylamine of the benzene and naphthalene series, by the reaction of an alkylene oxide on the corresponding primary amine, the improvement which comprises mixing with the primary amine before the introduction of the alkylene oxide an amount of the N,N bis-(beta-hydroxy alkyl)-arylamine to be produced corresponding to at least 20–25% of the weight of the primary amine and an effective amount of a catalyst belonging to the group consisting of acids having a dissociation constant greater than $10^{-6}$ and salts thereof with weak bases, the catalyst being free from hydroxy amino groups incapable of substituting or oxidizing the primary amine under reaction conditions and being dispersible in the reaction mixture.

5. A method according to claim 1 in which the primary amine is aniline and the alkyene oxide is ethylene oxide.

6. A method according to claim 3 in which the primary amine is aniline, the alkylene oxide is ethylene oxide, and the catalyst is aniline hydrochloride.

7. A method according to claim 1 in which the primary amine is m-toluidine and the alkylene oxide is ethylene oxide.

8. A method according to claim 3 in which the primary amine is m-toluidine, the alkylene oxide is ethylene oxide, and the catalyst is aniline hydrochloride.

HANS Z. LECHER.
MARTIN L. KESLER.

REFERENCES CITED

The following references are of record in the file of this patent:

UNITED STATES PATENTS

| Number | Name | Date |
|---|---|---|
| 1,907,444 | Reddelien et al. | May 9, 1933 |
| 1,996,003 | Dehnert et al. | Mar. 26, 1935 |
| 2,257,817 | Seymour et al. | Oct. 7, 1941 |
| 2,275,470 | Ruark | Mar. 10, 1942 |

FOREIGN PATENTS

| Number | Country | Date |
|---|---|---|
| 296,309 | Great Britain | Nov. 27, 1929 |